United States Patent Office 2,803,668
Patented Aug. 20, 1957

2,803,668
PROCESS FOR MAKING CHLOROACETAL

Leo R. Morris, Midland, and Raymond P. Mayer, Alma, Mich., assignors to The Dow Chemical Company, Midland, Mich., a corporation of Delaware No Drawing. Application August 31, 1956, Serial No. 607,259

2 Claims. (Cl. 260—615)

This invention relates to the production of 1,1-diethoxy-2-chloroethane, also known as chloroacetaldehyde diethyl acetal, hereinafter referred to as chloroacetal.

Chloroacetal has many uses as a chemical intermediate, one of the best known being in the synthesis of 2-aminothiazole and sulfathiazole.

According to the invention, chloroacetal is produced in one step by the chlorination of vinyl chloride in ethyl alcohol. The temperature at which the reaction is conducted is critical. Below about 20° C. the rate of reaction is quite low while above about 60° the principal products are dichloroacetal and 1,1,2-trichloroethane. The presence of a little water in the reaction mixture is highly advantageous, though none is consumed in the reaction. For this reason, ordinary 95 percent ethyl alcohol gives faster reaction and higher yield of chloroacetal then does absolute alcohol. The reaction is exothermic; hence, suitable means for controlling the temperature should be provided.

In its simplest form, the invention may be practiced by simply sparging vinyl chloride and chlorine into 95 percent ethanol, preferably at about 30 to 40° C. The two gases should be fed in at substantially equal rates, since they react in a 1:1 molar ratio. No special apparatus is required for the reaction. The process is easily adaptable to continuous operation, a suitable apparatus for this being a tower reactor, jacketed for temperature control and provided with an agitator. The reactants would be fed continuously into the bottom and the alcoholic solution of products would be withdrawn at the top.

The following examples illustrate the practice of the invention

EXAMPLE I

*Apparatus.*—The reactor consisted of a vertically mounted glass tube 1" x 24" connected by U-tubes at top and bottom to a water-jacketed side-tube ½" x 18" mounted alongside and parallel to the reactor tube, thus forming a closed circuit. The reactor tube also had two inlets at the bottom leading to fritted glass gas dispersers in the reactor tube. At the top the reactor tube was open to the atmosphere through an expansion bulb. A thermometer was inserted through the bulb into the top of the reactor.

*Procedure.*—The reactor was filled to the expansion bulb with ethyl alcohol and the temperature was adjusted to and maintained at the desired point by circulating hot or cold water through the jacket of the side-tube. Vinyl chloride and chlorine were fed into the bottom of the reactor as fast as they were absorbed by the alcohol. In the beginning of a run this rate was relatively low but as the reaction proceeded the solubility of the gases in the reaction mixture and the rate of reaction increased so the feed-rate of the gases could be increased likewise.

While a much higher conversion of the alcohol is possible, it is preferred to stop the reaction when the concentration of the product in the alcohol medium is in the range of about 10 to 25 percent. A lower conversion requires the handling of unnecessarily large volumes of alcohol while at higher conversions an increasingly large proportion of the desired chloroacetal is further chlorinated to dichloroacetal. This latter effect is particularly noted when the process is carried out at temperatures above about 40° C. Another byproduct sometimes produced, especially at higher temperatures, is trichloroethane, presumably formed by the direct addition of chlorine to vinyl chloride.

After the reaction was stopped, the alcoholic solution of the product was neutralized with sodium bicarbonate and at this point the product was either dried with calcium chloride and then distilled in vacuum or, more conveniently, was distilled without drying. In the latter case, a water azeotrope distilled at 94° C. at atmospheric pressure until all water had been removed, after which the distillation was completed under vacuum. Redistillation of the organic layer of the azeotrope distillate yielded a small amount of trichloroethane as a low-boiling fraction, followed by chloroacetal, B. P. 64° C. (23 mm. pressure). Sometimes a little dichloroacetal was obtained as a high-boiling fraction. At higher reaction temperatures the amounts of these by-products were substantial.

The results obtained in several experiments in which the above procedure was followed are shown in Table I.

Table I
CHLORINATION OF VINYL CHLORIDE IN ETHANOL

| Ethanol, conc., percent | Temp., ° C. | Reaction time, hrs. | Total Product, g. | Yield of Products, Percent | | |
|---|---|---|---|---|---|---|
| | | | | Chloroacetal | Dichloroacetal | Trichloroethane |
| Absolute | 40 | 4 | 9.1 | 75 | | |
| 95 | 20 | 6 | 31.4 | 64 | 7 | 10 |
| 95 | 40 | 4 | 40.4 | 98 | | |
| 95 | 50 | 4 | 88.9 | 20 | 30 | 41 |
| 95 | 60 | 2 | 118.4 | 10 | 36 | 34 |

Although it is preferred to use 95 percent alcohol in our process, other concentrations may be used. Also, other primary lower alkanols, such as methanol, propanol, butanol, isobutanol and the primary pentanols may be used to prepare the corresponding chloroacetals.

We claim:
1. A process for making chloroacetal comprising simultaneously mixing substantially equimolecular amounts of vinyl chloride and chlorine with a large molar excess of ethyl alcohol at a temperature in the range of about 20 to 60° C.
2. A process as in claim 1 wherein the ethyl alcohol contains about 5 percent of water.

No references cited.